(12) United States Patent
Loh

(10) Patent No.: US 9,100,099 B2
(45) Date of Patent: Aug. 4, 2015

(54) ADAPTIVE TRANSMITTER LEAKAGE CANCELATION IN A TRANSCEIVER

(71) Applicant: Samsung Electronics Co., Ltd., Suwon-si, Gyeonggi-do (KR)

(72) Inventor: Lup Meng Loh, Plano, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 242 days.

(21) Appl. No.: 13/760,984

(22) Filed: Feb. 6, 2013

(65) Prior Publication Data

US 2014/0220908 A1  Aug. 7, 2014

(51) Int. Cl.
*H04B 1/44* (2006.01)
*H04B 1/40* (2015.01)

(52) U.S. Cl.
CPC ........................................ *H04B 1/40* (2013.01)

(58) Field of Classification Search
CPC ............. H04B 1/48; H04B 1/44; H04B 1/525

USPC ............................................................ 455/78
See application file for complete search history.

(56) References Cited

U.S. PATENT DOCUMENTS

| 7,672,643 | B2 * | 3/2010 | Loh .............................. 455/63.1 |
| 7,756,480 | B2 | 7/2010 | Loh |
| 7,773,967 | B2 * | 8/2010 | Smith ........................... 455/295 |
| 7,840,197 | B2 * | 11/2010 | Mirzaei et al. ................ 455/126 |
| 8,526,903 | B2 * | 9/2013 | Gudem et al. ................ 455/310 |

OTHER PUBLICATIONS

Safarian, et al., "Integrated Blocker Filtering RF Front Ends", IEEE Radio Frequency Integrated Circuits Symposium, 2007, pp. 13-16.

* cited by examiner

*Primary Examiner* — April G Gonzales

(57) ABSTRACT

An apparatus and method cancel transmitter leakage. The method includes generating a leakage cancelation signal by processing a downconverted signal for cancelation of a leakage signal caused by a transmitter and upconverting the downconverted signal to a radio frequency of the transmitter. The method also includes canceling at least some of the leakage signal in a received signal using the leakage cancelation signal.

20 Claims, 5 Drawing Sheets

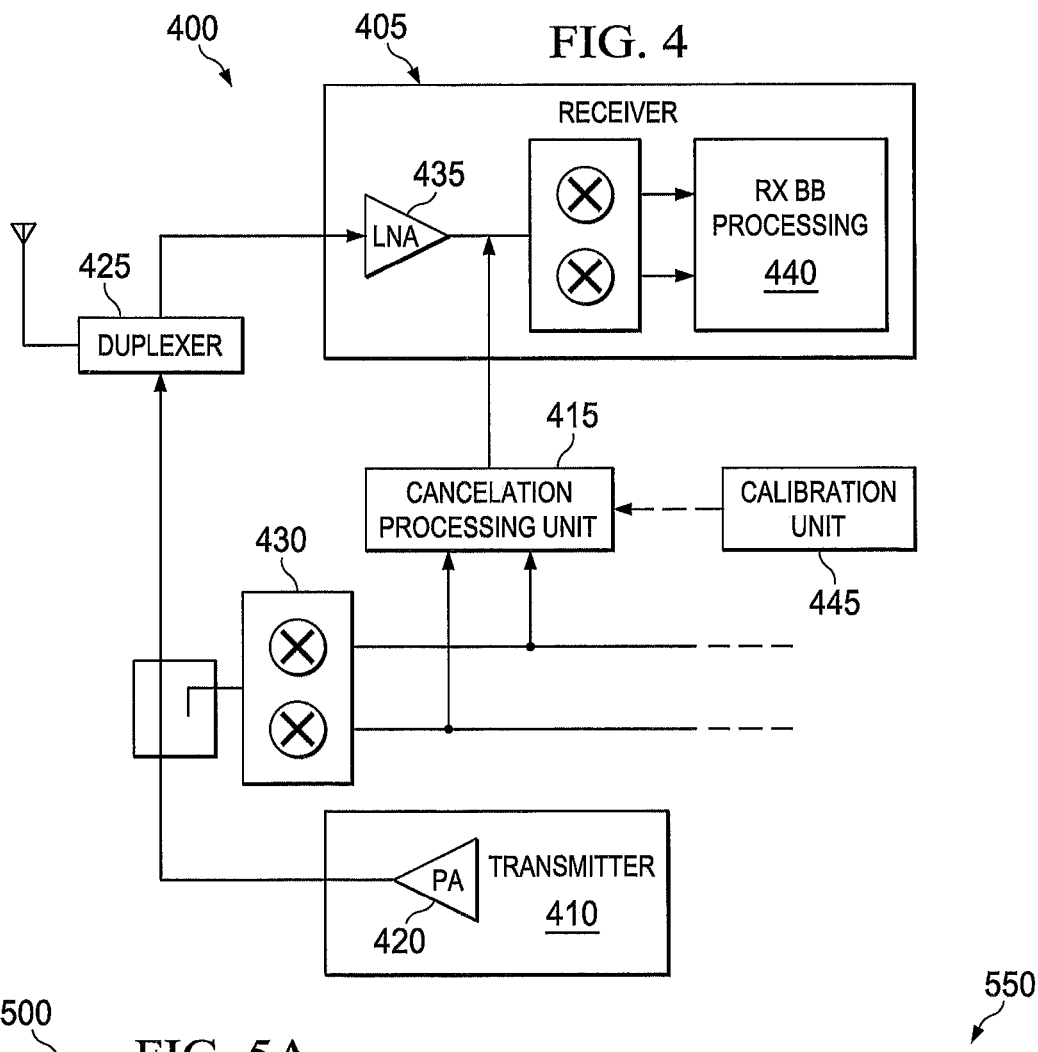
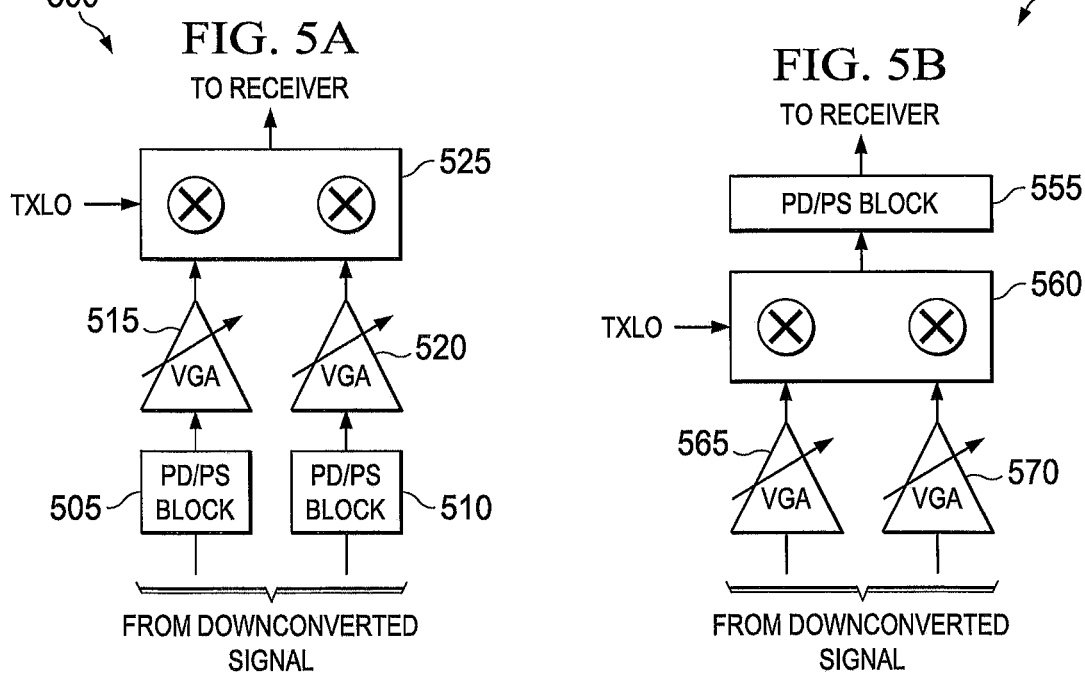

ADAPTIVE TRANSMITTER LEAKAGE CANCELATION IN A TRANSCEIVER

TECHNICAL FIELD

The present application relates generally to processing of received signals in a wireless network and, more specifically, to cancelation of transmitter leakage into a receiver.

BACKGROUND

In transceivers, receivers and transmitters may share common components (e.g., antennas, front end units, etc.) and/or have limited isolation from each other. For effective wireless communication, transmitted signals need to travel long distances and, accordingly, require emitting relatively high power at the antenna of the transceiver. On the other hand, received signals may have traveled long distances and have much weaker power compared with the transmitter at the shared antenna. Due to the power disparity between transmitted and received signals, the transmitted signal that leaks into the receiver often imposed design challenges on the shared components as well as the rest of the receiver in order to achieve performance requirements. One example is higher order product caused by the transmitter leakage appearing at the receiver that may decrease the sensitivity of the receiver.

A Full-Duplex (FDD) direct-conversion transceiver adopted an external inter-stage filter between the low-noise amplifier (LNA) and first mixer at the receiver to help mitigate the transmit signal coming through as leakage from a design specified isolation limited duplexer. The object of this external inter-stage filter was to ease the linearity requirements of the quadrature mixer after the LNA, which compounds the challenge by amplifying the transmit leakage. Proliferation of wireless bands forced designers to adopt high linearity mixer design methodology to remove the usage of external inter-stage filters by relying just on existing duplexer design. Such a receiver design is currently adopted in most commercial cellular transceiver application-specific integrated circuits (ASICs) for mobile terminals in the wireless industry today. Design restricted by stringent isolation needs shouldered only by duplexer design results in significant insertion losses both to the transmitter and receiver, particularly when there is small spectrum separation between transmit and receive bands. This causes the loss of power efficiency and receiver sensitivity, respectively.

Therefore, there is a need for an improved transceiver design. In particular, there is a need for adaptive transmitter leakage cancelation in a transceiver.

SUMMARY

Embodiments of the present disclosure provide a method and apparatus for adaptive transmitter leakage cancelation in a transceiver.

In one embodiment, a method for canceling transmitter leakage is provided. The method includes generating a leakage cancelation signal by processing a downconverted transmit signal for cancelation of a leakage signal caused by a transmitter at RF receiver with upconverting the downconverted signal back to a radio frequency of the transmitter. The method also includes canceling at least some of the leakage signal in a received signal using the leakage cancelation signal.

In another embodiment, an apparatus in a transceiver configured to cancel transmitter leakage is provided. The apparatus includes a cancelation processing unit configured to receive a downconverted signal. The cancelation processing unit is also configured to process the downconverted transmit signal for cancelation of a leakage signal caused by a transmitter and upconvert the downconverted signal to a radio frequency of the transmitter to generate a leakage cancelation signal. The cancelation processing unit is further configured to cancel at least some of the leakage signal in the receiver using the leakage cancelation signal.

In yet another embodiment, a transceiver having adaptive transmitter leakage cancelation is provided. The transceiver includes a receiver, a transmitter, a feedback receiver, and a cancelation processing unit. The receiver is configured to receive a receiver signal. The transmitter is configured to transmit a transmitter signal and includes comprising a power amplifier. The feedback receiver is configured to sample an output signal of the power amplifier and downconvert the sampled signal. The cancelation processing unit is configured to receive the downconverted signal from the feedback receiver. The cancelation processing unit is also configured to process the downconverted signal for cancelation of a leakage signal caused by the transmitter signal and upconvert the downconverted signal to a radio frequency of the transmitter to generate a leakage cancelation signal. The cancelation processing unit is further configured to supply the leakage cancelation signal to a path of the receiver to cancel at least some of the leakage signal in the receiver signal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 illustrates a block diagram of an exemplary transceiver including cancelation processing that may be used to implement various embodiments of the present disclosure;

FIGS. 5A and 5B illustrate block diagrams of exemplary configurations of the cancelation processing unit in FIG. 4 that may be used to implement various embodiments of the present disclosure;

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that strict isolation requirements on duplexer designs have a negative impact on power efficiency and receiver sensitivity. Embodiments of the present disclosure also recognize that certain techniques for transmitter leakage cancelation may not achieve substantial or consistent results because direct amplitude, phase, and delay manipulation may be subject to dynamic variations. Embodiments of the present disclosure also recognize that processing for transmitter leakage cancelation may require multiple separate components that each has a cost in terms of space and power consumption.

Accordingly, embodiments of the present disclosure provide an apparatus and method for adaptive transmitter leakage cancelation in a transceiver. Embodiments of the present disclosure perform closed loop transmitter leakage cancelation using downconverted signals. Using signals with downconverted frequencies may decrease the variations present in amplitude, phase, and delay processing. Embodiments of the present disclosure utilize components already existing in multiple transceiver designs to perform leakage cancelation. This utilization of existing components may provide power, component, and space savings over alternative techniques. Embodiments of the present disclosure also incorporate dynamic monitoring and adjustment of leakage cancelation. This adaptive leakage cancelation may continuously reduce the amount of transmitter leakage arriving at baseband, thereby improving receiver sensitivity. The increased receiver sensitivity may be used by designers to reduce the duplexer isolation requirements, thereby improving power efficiency and receiver sensitivity.

Figure 1:
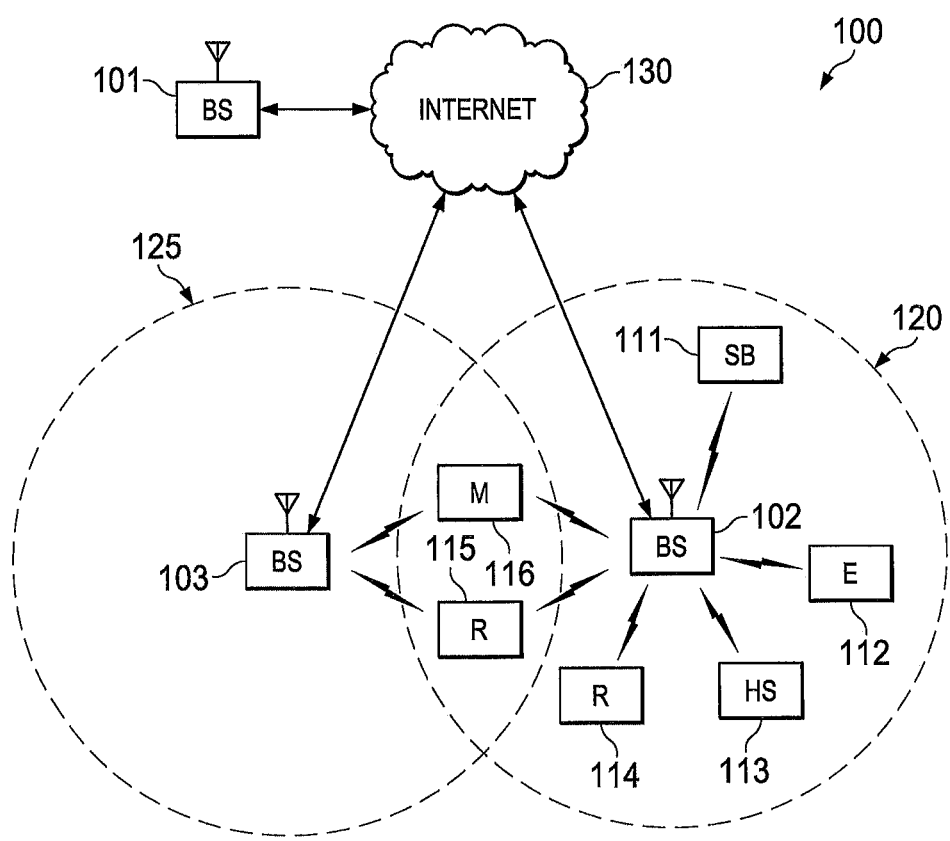
FIG. 1 illustrates an exemplary wireless system which transmits messages in accordance with an illustrative embodiment of the present disclosure.
Figure 2:
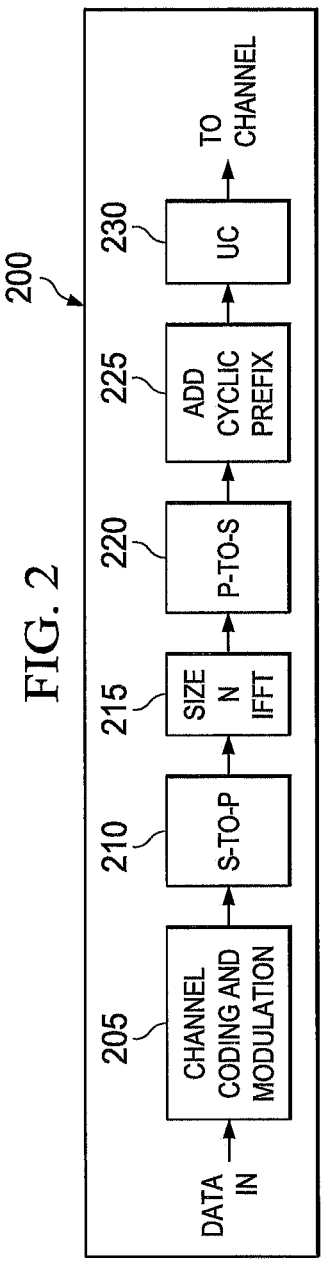
FIG. 2 illustrates a high-level diagram of an orthogonal frequency division multiple access transmit path in accordance with an illustrative embodiment of the present disclosure.
Figure 3:
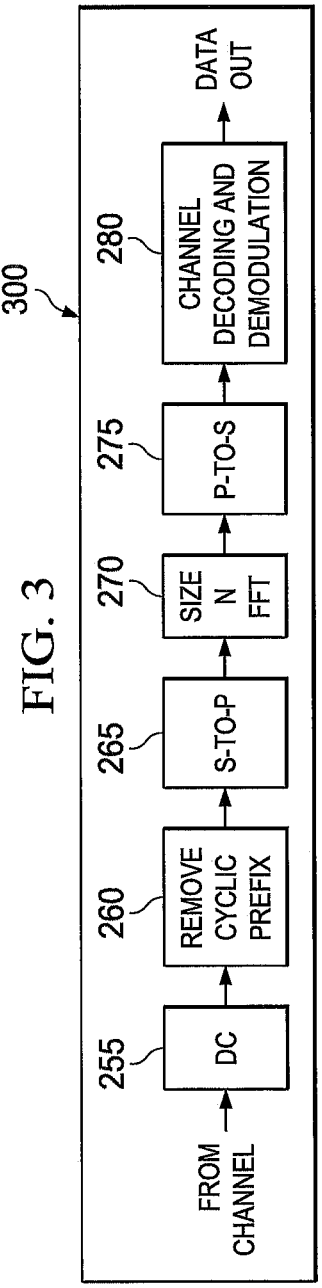
FIG. 3 illustrates a high-level diagram of an orthogonal frequency division multiple access receive path in accordance with an illustrative embodiment of the present disclosure.

FIGS. 1-3 below describe various embodiments implemented in wireless communication systems and with the use of OFDM or OFDMA communication techniques. The description of FIGS. 1-3 is not meant to imply physical or architectural limitations to the manner in which different embodiments may be implemented. Different embodiments of the present disclosure may be implemented in any suitably arranged communications system.

FIG. 1 illustrates exemplary wireless system 100, which transmits messages according to the principles of the present disclosure. In the illustrated embodiment, wireless system 100 includes transmission points (e.g., an Evolved Node B (eNB), Node B), such as base station (BS) 101, base station (BS) 102, base station (BS) 103, and other similar base stations or relay stations (not shown). Base station 101 is in communication with base station 102 and base station 103. Base station 101 is also in communication with Internet 130 or a similar IP-based system (not shown).

Base station 102 provides wireless broadband access (via base station 101) to Internet 130 to a first plurality of user equipment (e.g., mobile phone, mobile station, subscriber station) within coverage area 120 of base station 102. The first plurality of user equipment includes user equipment 111, which may be located in a small business (SB); user equipment 112, which may be located in an enterprise (E); user equipment 113, which may be located in a WiFi hotspot (HS); user equipment 114, which may be located in a first residence (R); user equipment 115, which may be located in a second residence (R); and user equipment 116, which may be a mobile device (M), such as a cell phone, a wireless laptop, a wireless PDA, or the like.

Base station 103 provides wireless broadband access (via base station 101) to Internet 130 to a second plurality of user equipment within coverage area 125 of base station 103. The second plurality of user equipment includes user equipment 115 and user equipment 116. In an exemplary embodiment, base stations 101-103 may communicate with each other and with user equipment 111-116 using OFDM or OFDMA techniques.

While only six user equipment are depicted in FIG. 1, it is understood that wireless system 100 may provide wireless broadband access to additional user equipment. It is noted that user equipment 115 and user equipment 116 are located on the edges of both coverage area 120 and coverage area 125. User equipment 115 and user equipment 116 each communicate with both base station 102 and base station 103 and may be said to be operating in handoff mode, as known to those of skill in the art.

User equipment 111-116 may access voice, data, video, video conferencing, and/or other broadband services via Internet 130. In an exemplary embodiment, one or more of user equipment 111-116 may be associated with an access point (AP) of a WiFi WLAN. User equipment 116 may be any of a number of mobile devices, including a wireless-enabled laptop computer, personal data assistant, notebook, handheld device, or other wireless-enabled device. User equipment 114 and 115 may be, for example, a wireless-enabled personal computer (PC), a laptop computer, a gateway, or another device.

FIG. 2 is a high-level diagram of transmit path circuitry 200. For example, the transmit path circuitry 200 may be used for an orthogonal frequency division multiple access (OFDMA) communication. FIG. 3 is a high-level diagram of receive path circuitry 300. For example, the receive path circuitry 300 may be used for an orthogonal frequency division multiple access (OFDMA) communication. In FIGS. 2 and 3, for downlink communication, the transmit path circuitry 200 may be implemented in base station (BS) 102 or a relay station, and the receive path circuitry 300 may be implemented in a user equipment (e.g. user equipment 116 of FIG. 1). In other examples, for uplink communication, the receive path circuitry 300 may be implemented in a base station (e.g. base station 102 of FIG. 1) or a relay station, and the transmit path circuitry 200 may be implemented in a user equipment (e.g. user equipment 116 of FIG. 1).

Transmit path circuitry 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. Receive path circuitry 300 comprises down-converter (DC) 255, remove cyclic prefix block 260, serial-to-parallel (S-to-P) block 265, Size N Fast Fourier Transform (FFT) block 270, parallel-to-serial (P-to-S) block 275, and channel decoding and demodulation block 280.

At least some of the components in FIGS. 2 and 3 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path circuitry 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel, and reverse operations to those at BS 102 are performed. Down-converter 255 down-converts the received signal to baseband frequency, and remove cyclic prefix block 260 removes the cyclic prefix to produce the serial time-domain baseband signal. Serial-to-parallel block 265 converts the time-domain baseband signal to parallel time-domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to base stations 101-103 and may implement a receive path corresponding to the architecture for receiving in the downlink from base stations 101-103.

FIG. 4 illustrates a block diagram of an exemplary transceiver 400 including cancelation processing that may be used to implement various embodiments of the present disclosure. Transceiver 400 includes a receiver 405 and a transmitter 410.

In accordance with various embodiments of the present disclosure, the transceiver 400 includes a cancelation processing unit 415 to reduce leakage from the signal from the transmitter 410 onto the signal received by the receiver 405. The cancelation processing unit 415 processes an output of the transmitter 410 to generate a leakage cancelation signal that is supplied to the signal on the path in the receiver 405. The cancelation processing unit 415 processes the leakage cancelation signal in a manner to cancel at least some of the leakage signal present in the signal received by the receiver 405.

For example, the cancelation processing unit 415 receives a signal sampled from the output of a power amplifier 420 in the transmitter 410. This sampled signal is the output of the transmitter 410 at the transmitter's radio frequency (TX RF). Sampling the output from the transmitter 410 gives the cancelation processing unit 415 an indication of what the leakage signal imposed upon the received signal at the duplexer 425 will look like. A frequency mixer 430 downconverts this sampled signal from TX RF to a lower frequency. For example, the frequency mixer 430 may downconvert the signal to some intermediate frequency (IF) or to a baseband (BB) frequency used for baseband processing in the transceiver 400.

The cancelation processing unit 415 generates the leakage cancelation signal by performing time alignment or phase alignment, amplitude matching, and phase inversion on the sampled output from the transmitter 410 to cancel the leakage signal in the received signal. For example, signal processing in the duplexer 425 and receiver 405 may cause the leakage signal to reach the point where the leakage cancelation signal is supplied later than the sampling of the output of the transmitter 410 is received at the cancelation processing unit 415. Thus, the cancelation processing unit 415 may time delay or phase adjust the sampled signal to attempt to match in time or phase of the leakage cancelation signal carrier with the carrier of the leakage signal in the received signal. The matching used herein may not be an exact match. For example, the cancelation processing unit 415 attempts to match the amplitude and timing of the leakage cancelation signal to the leakage signal. However, there may be differences in the matched amplitudes and/or timing due to calculation variations, device tolerances, and/or other variations that may be present and/or unaccounted for in the transceiver 400. The amount of the delay may be preset based on known parameters (e.g., a known amount of delay caused by components in the receiver 405) of the transceiver 400 and/or adjusted based on feedback, which will be discussed below.

The cancelation processing unit 415 also attempts to match the amplitude of the leakage cancelation signal with the expected amplitude of the leakage signal. For example, the cancelation processing unit 415 may decrease or increase the amplitude of the sampled signal. The amount of the increase or decrease may be preset based on known signal power parameters of the transceiver 400 and/or adjusted based on feedback, which will be discussed below.

At some point during the processing of the sampled signal into the leakage cancelation signal, the cancelation processing unit 415 upconverts the signal to the RF of the transmitter 410. Additionally, the cancelation processing unit 415 inverts the phase of the sampled signal. Phase inversion of the time-aligned or phase aligned, amplitude-matched, frequency-matched leakage cancelation signal allows the leakage cancelation signal to cancel out at least some of the leakage signal present in the received signal. The cancelation processing unit 415 supplies this leakage cancelation signal to the receive path of receiver 405 to cancel out at least some of the leakage signal imposed on the received signal by the transmitted signal. For example, the cancelation processing unit 415 may provide the leakage cancelation signal to the receiver's 405 path the output of the low-noise amplifier 435 (LNA). Such a configuration reduces the impact of the signal modification on the overall receiver performance. In other embodiments, the leakage cancelation signal may be provided at other points along the receive path of the receiver 405.

In various embodiments of the present disclosure, some of the components used to provide the leakage cancelation in the transceiver 400 may utilize components already present in current transceiver designs. For example, with the advent of closed loop digital pre-distortion (DPD) and front-end tunable match network (TMN) technology, a feedback path may be implemented in the RF ASIC. In these embodiments, the advantageous effects of the present disclosure may be implemented using components present for DPD and/or TMN purposes. For example, the signal sampled and downconverted from the transmitter 410 output may be received from a feedback receiver used for DPD management. Thus, the sampling and downconverting used in leakage cancelation according to the present disclosure may not require components to be added to the transceiver design. In another example, the cancelation processing unit 415 may use a signal from a local oscillator (not illustrated in FIG. 4) in the transmitter 410 in performing the upconversion of the leakage cancelation signal to RF.

Various embodiments of the present disclosure perform at least part of the processing of the sampled signal into the leakage cancelation signal at a frequency that is lower than the RF of the transmitter 410. For example, at least one of the time delaying, phase inversion, and amplitude matching is performed on the sampled signal at a frequency lower than RF, such as an IF or at BB. Embodiments of the present disclosure recognize that small phase mismatches at higher frequencies can result in larger differences than mismatches at lower frequencies. For example, a few nanoseconds of a mismatch in timing may be negligible at a lower frequency but may be a significant difference at a higher frequency due to the shorter cycle time of the higher frequency. Analog processing at RF may also consume more power than processing at a lower frequency. Also, if the transmitter 410 uses different RFs, RF processing may increase component complexity and/or power consumption. As a result, the component reuse and limited RF processing of embodiments of the present disclosure have small space and power requirements to implement.

Various embodiments of the present disclosure provide a dynamic closed loop calibration of the leakage cancelation signal generated by the cancelation processing unit 415. For example, if the entire leakage signal is not canceled by the leakage cancelation signal, a remnant of the leakage cancelation signal will reach receiver (RX) baseband processing 440. A calibration unit 445 identifies and processes this remnant to modify parameters used by the cancelation processing unit 415 to achieve more cancelation.

The calibration unit 445 processes and compares this remnant with the transmit signal from the feedback path in variables of amplitude, phase, and delay differences. Using the remnant level as reference, the calibration unit 445 uses a calibration algorithm to modify the previous gain and phase or delay parameters used by the cancelation processing unit 415 relative to the feedback transmit signal to reduce the remnant level or keep the remnant level below a specified threshold. Such corrections may be useful to counter part-to-part variations in the transceiver 400, process variations, temperature changes, voltage bias changes, power level induced changes, matching or loading changes, linearization alterations, different modes, frequency changes, and any other variables that may affect the leakage signal present in the received signal.

For example, the calibration unit 445 may implement a dynamic closed loop calibration in digital domain by correlating the remnant transmit leakage at the RX BB processing 440 with a reference transmit signal from the DPD feedback digital signal processor (DSP). This calibration allows for tighter control of the parameters used to generate the leakage cancelation signal and larger rejection of the leakage signal in the receiver 405. Accordingly, various embodiments of the present disclosure may allow significant isolation relaxation at the duplexer 425. This relaxation may lead to transceiver designs that achieve lower insertion losses, thereby improving power efficiency and sensitivity in wireless communication devices.

The illustration and description of the transceiver 400 in FIG. 4 is not meant to imply physical or architectural limitations to the manner in which different embodiments may be implemented. The transceiver 400 is illustrated and described with the exemplary components described above for the purposes of understanding the embodiments of the present disclosure. The transceiver 400 may include any other components not shown in FIG. 4 that may be present in wireless transceivers.

For example, while FIG. 4 illustrates the cancellation path combined with the receiver path at the output of the LNA 435, the paths may be combined at any point along the receiver path for the purpose of transmit leakage cancelation. The details of DSP and algorithm for dynamic calibration may vary according to implementation. The time delay or phase shift, amplitude matching, phase inversion, and frequency upconversion performed by cancelation processing unit 415 may be performed in any suitable order. Additionally, the time delay, amplitude matching, and phase inversion are examples of cancelation processing that may be performed by the cancelation processing unit 415. Other types of signal processing may be utilized in place of or in addition to the signal processing described with regard to the cancelation processing unit 415 to effectuate the cancelation achieving effects described herein.

FIGS. 5A and 5B illustrate block diagrams of exemplary configurations of the cancelation processing unit 415 in FIG. 4 that may be used to implement various embodiments of the present disclosure. As illustrated in the exemplary embodiment of FIG. 5A, the cancelation processing unit 500 includes two programmable delay/phase shifting (PD/PS) blocks 505 and 510. The PD/PS blocks 505 and 510 perform time delay or phase shifting on respective real and imaginary signals, respectively, coming from the sampled and downconverted output from the transmitter 410. The PD/PS blocks 505 and 510 may be pre-programmed to implement a pre-specified time delay. The PD/PS blocks 505 and 510 may also be controlled (e.g., by the calibration unit 445) to modify the time delay imposed on the signals passing through.

The cancelation processing unit 500 includes two variable gain amplifiers (VGAs) 515 and 520 that modify the amplitude of the real and imaginary signals, respectively. The VGAs 515 and 520 may be pre-set to implement a pre-specified amplitude gain. The VGAs 515 and 520 may also be controlled (e.g., by the calibration unit 445) to modify the amplitude gain created in the signals passing through. The cancelation processing unit 500 also includes a frequency mixer 525 to upconvert the downconverted signal to the RF of the transmitter 410. For example, the frequency mixer 525 may use a signal from the local oscillator of the transmitter 410 (TXLO). This upconverted and processed signal is sent to the receiver path as the leakage cancelation signal.

FIG. 5B illustrates another embodiment of the cancelation processing unit 415 in FIG. 4. For example, in the exemplary embodiment illustrated in FIG. 5B, the cancelation processing unit 550 includes one PD/PS block 555 that is located after upconversion of the signal by the frequency mixer 560. The cancelation processing unit 550 includes two VGAs 565 and 570 that modify the amplitude of the real and imaginary downconverted signals, respectively. As illustrated by the example embodiments in FIGS. 5A and 5B, the time delay or phase shift, amplitude matching, phase inversion, and frequency upconversion performed by cancelation processing unit 415 may be performed in any suitable order.

Figure 6:
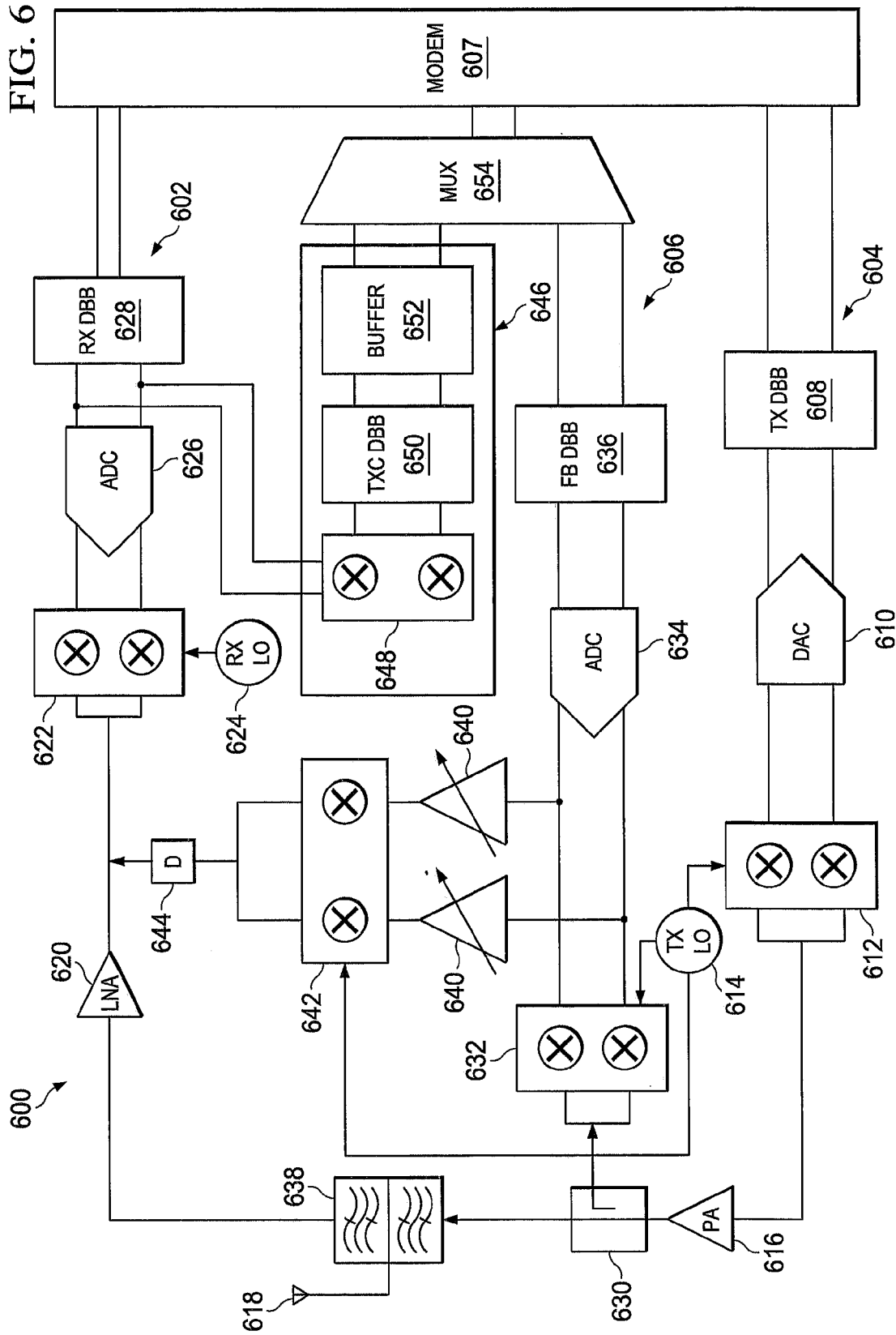
FIG. 6 illustrates a block diagram of an exemplary transceiver including cancelation and baseband processing that may be used to implement various embodiments of the present disclosure.

FIG. 6 illustrates a block diagram of an exemplary transceiver 600 including cancelation and baseband processing that may be used to implement various embodiments of the present disclosure. The transceiver 600 is an example of one embodiment of the transceiver 400 in FIG. 4.

As illustrated, the transceiver 600 includes a receiver 602, a transmitter 604, and a DPD feedback receiver 606. The transmitter 604 implements a transmit path that includes modulation of the transmit signal by modem 607, transmitter (TX) digital baseband (DBB) processing at block 608, digital-to-analog conversion (DAC) at block 610, upconversion to RF at mixer 612 using TXLO 614, signal amplification by PA 616, and wireless transmission by antenna(s) 618. The receiver 602 implements a receive path that includes low noise amplification of the received signal by LNA 620, downconversion to BB via mixer 622 and RXLO 624, analog-to-digital conversion (ADC) at block 626, receiver (RX) digital baseband (DBB) processing at block 628, and demodulation by modem 607.

The DPD feedback receiver 606 samples the output of the transmitter 604 from the PA 616 via a coupler 630. The DPD feedback receiver 606 implements a feedback path for DPD management that includes downconversion by mixer 632 using TXLO 614, ADC at block 634, and feedback (FB) digital baseband (DBB) processing at block 636 for DPD management processing by modem 607.

Embodiments of the present disclosure recognize that the sampled signal may be used as a reference for the leakage signal imposed on the receiver signal at the duplexer 638. The downconverted signal from the feedback receiver 606 processed for leakage cancelation using the VGAs 640, the mixer 642, and a PD/PS block 644 as described above with regard to the cancelation processing unit 415. This leakage cancelation signal is provided to the receiver path for leakage cancelation.

Due to any number of variations within the cancelation signal matching or in the transceiver 600, a remnant of the leakage signal may remain in the received signal. In this illustrative embodiment, this leakage remnant is processed by a transmitter leakage cancelation (TXC) block 646. If the RX RF is different than the TX RF, then the frequency of the leakage signal will be different than that of the received signal by some frequency offset. The TXC block 646 filters the received signal from the leakage remnant (e.g., using a frequency filter) by downconverting, via mixer 648, the leakage remnant to baseband to account for the frequency offset and filtering. The TXC DBB 650 performs baseband processing on the leakage remnant. The buffer 652 stores the leakage remnant for multiplexing with the output from the DPD feedback receiver 606 via multiplexer (MUX) 654.

The modem 607 uses the multiplexed signals to perform closed loop control of the leakage cancelation. For example, the modem 607 may implement a dynamic closed loop calibration in digital domain by cross-correlating the remnant transmit leakage at the leakage remnant received from the TXC block 646 with the sampled signal of the transmitter 604 received from the DPD feedback receiver 606. Using the remnant level as reference, the modem 607 uses a calibration algorithm to modify the previous gain, phase or delay parameters used by the cancelation processing unit 415 relative to the feedback transmit signal to reduce the remnant level or keep the remnant level below a specified threshold. This calibration allows for tighter control of the parameters used to generate the leakage cancelation signal and larger rejection of the leakage signal in the receiver 602.

Figure 7:
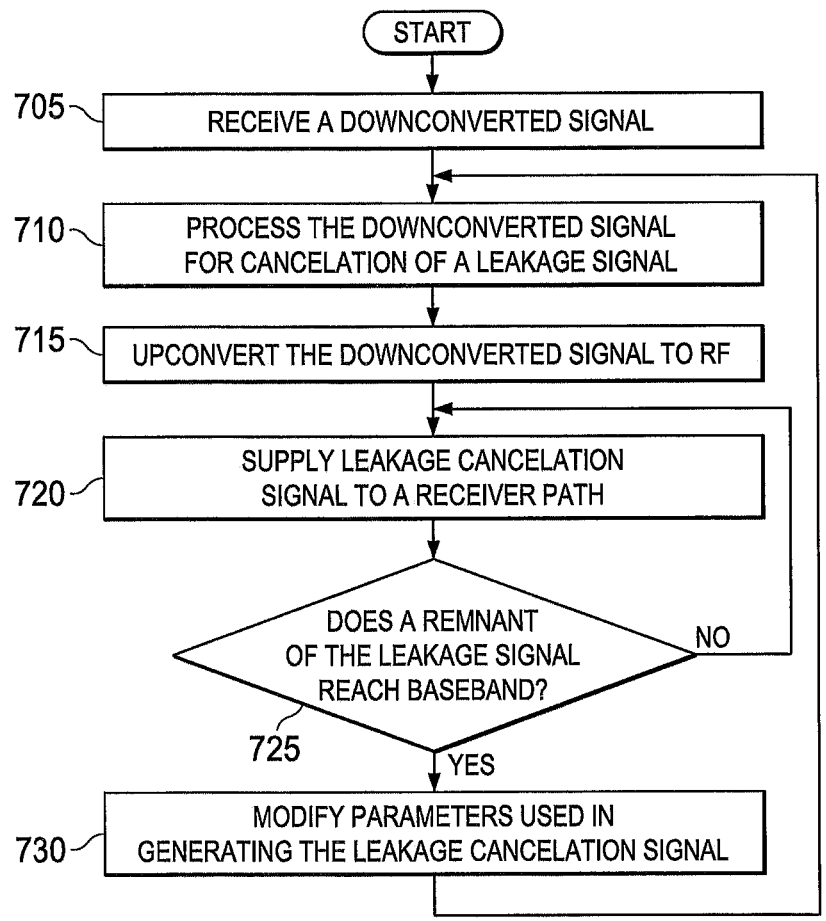
FIG. 7 illustrates a flowchart of a process for canceling transmitter leakage in accordance with various embodiments of the present disclosure.

FIG. 7 illustrates a flowchart of a process for canceling transmitter leakage in accordance with various embodiments of the present disclosure. For example, the process depicted in FIG. 7 may be performed by the cancelation processing unit 415 and the calibration unit 445 in the transceiver 400 in FIG. 4. The process may also be implemented in the transceiver 600 in FIG. 6.

The process begins by receiving a downconverted signal (step 705). For example, in step 705, the cancelation processing unit 415 may receive this downconverted signal from a feedback receiver, such as the DPD feedback receiver 606, sampling a transmitter output. The DPD feedback receiver 606 may downconvert the signal from the TX RF to baseband.

The process then processes the downconverted signal for cancelation of a leakage signal (step 710). For example, in step 710, the cancelation processing unit 415 may perform at least one of a time delay, amplitude matching, or a phase inversion on the downconverted signal. Thereafter, the process upconverts the downconverted signal to RF (step 715). For example, in step 715, a mixer may upconvert the downconverted signal to a radio frequency of the transmitter using a local oscillator of the transmitter. Additional cancelation processing may be performed after upconversion of the signal to TX RF. For example, the PD/PS block 644 may perform time delay after upconversion of the downconverted signal to align a timing of the leakage cancelation signal with a timing of the leakage signal.

The process then supplies a leakage cancelation signal to a receiver path (step 720). For example, in step 720, the cancelation processing unit 415 may provide the leakage cancelation signal generated in steps 710 and 715 to cancel at least some of the leakage signal in a signal received by the receiver 405.

Thereafter, the process identifies whether a remnant of the leakage signal reaches baseband (step 725). For example, in step 725, the TXC block 646 may identify the remnant via filtering, frequency offset, and digital baseband processing. The modem 607 may determine whether the remnant is present in the signal reaching baseband or whether the remnant identified is less than a threshold noise level. If the process does not identify a remnant of the leakage signal reaching baseband or the remnant identified is less than a threshold noise level, the process returns to step 720 to continue to supply the leakage cancelation signal to cancel the leakage signal.

If, however, the process identifies a remnant of the leakage signal reaching baseband or the remnant identified is greater than a threshold noise level, the process modifies parameters used in generating the leakage cancelation signal (step 730).

For example, in step 730, the calibration unit 445 may modify amplitude gain, phase shift, and/or time delay parameters used by the cancelation processing unit 415 to improve leakage signal reduction.

Embodiments of the present disclosure reduce the duplexer isolation requirements by providing suppression to the transmit leakage signal at the receiver. This relaxation in requirement allows duplexer design to improve on insertion losses in both transmit and receive band. Complex and excessive processing may be desired to improve the PA efficiency by a mere few percent. Embodiments of the present disclosure may provide a 1 dB reduction in insertion loss for a transmitter maintaining +23 dBm at the antenna. This reduction may represent an efficiency improvement between the PA output and the antenna by about 13 percent and will improve linearity performance.

In addition, the reduced isolation requirement enabled by embodiments of the present disclosure allows duplexer design with lower Q. This reduction facilitates tunability in duplexers, which may be a significant challenge of maintaining sufficient Q over the frequency tuning range. A tunable duplexer can reduce the board area requirements of the front-end unit as well as a number of RFIO requirements of the RF ASICs.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for canceling transmitter leakage, the method comprising:
generating a leakage cancelation signal by processing a downconverted signal for cancelation of a leakage signal caused by a transmitter and upconverting the downconverted signal to a radio frequency of the transmitter;
canceling at least some of the leakage signal in a received signal using the leakage cancelation signal;
identifying a remnant of the leakage signal in the received signal reaching baseband processing; and
modifying parameters used in generating the leakage cancelation signal based on the identified remnant of the leakage signal.

2. The method of claim 1, wherein identifying a remnant of the leakage signal in the received signal reaching baseband processing comprises shifting a frequency of the remnant of the leakage signal in the received signal to compensate for a frequency offset between a frequency of a receiver of the received signal and a frequency of the transmitter.

3. The method of claim 1, wherein generating the leakage cancelation signal comprises performing at least one of a time delay, amplitude matching, or a phase shifting on the downconverted signal.

4. The method of claim 3, wherein generating the leakage cancelation signal further comprises performing a time delay after upconversion of the downconverted signal to align a carrier of the leakage cancelation signal with a carrier of the leakage signal.

5. The method of claim 1 further comprising: receiving the downconverted signal from a feedback receiver used in digital pre-distortion management, wherein the downconverted signal is downconverted by the feedback receiver from the radio frequency of the transmitter.

6. The method of claim 1, wherein upconverting the downconverted signal comprises upconverting the downconverted signal using a local oscillator of the transmitter.

7. The method of claim 1, wherein canceling the at least some of the leakage signal in the received signal using the leakage cancelation signal comprises supplying the leakage cancelation signal to a receiver of the received signal after low noise amplification of the received signal.

8. The method of claim 1 further comprising receiving the downconverted signal sampled from an output signal of the transmitter.

9. An apparatus in a transceiver configured to cancel transmitter leakage, the apparatus comprising:
a cancelation processing unit configured to:
receive a downconverted signal;
process the downconverted signal for cancelation of a leakage signal caused by a transmitter and upconvert the downconverted signal to a radio frequency of the transmitter to generate a leakage cancelation signal; and
cancel at least some of the leakage signal in a received signal using the leakage cancelation signal; and
a calibration unit configured to identify a remnant of the leakage signal in the received signal reaching baseband, and modify parameters used in generating the leakage cancelation signal based on the identified remnant of the leakage signal.

10. The apparatus of claim 9 further comprising:
a frequency mixer associated with the calibration unit, the frequency mixer configured to shift a frequency of the remnant of the leakage signal in the received signal to compensate for a frequency offset between a frequency of a receiver of the received signal and a frequency of the transmitter.

11. The apparatus of claim 9, wherein the cancelation processing unit comprises:
a variable gain amplifier configured to match an amplitude of the downconverted signal with an amplitude of the leakage signal in generating the leakage cancelation signal; and
a programmable time delay/phase shift block configured to time delay or phase shift one of the downconverted signal or the upconverted signal in generating the leakage cancelation signal.

12. The apparatus of claim 11, wherein the programmable time delay/phase shift block is configured to perform the time delay or phase shift after upconversion of the downconverted signal to align a carrier of the leakage cancelation signal with a carrier of the leakage signal.

13. The apparatus of claim 9, wherein the cancelation processing unit is configured to receive the downconverted signal from a feedback receiver used in digital pre-distortion management, wherein the downconverted signal is downconverted by the feedback receiver from the radio frequency of the transmitter.

14. The apparatus of claim 9, wherein the cancelation processing unit is configured to upconvert the downconverted signal using a local oscillator of the transmitter.

15. The apparatus of claim 9, wherein to cancel the at least some of the leakage signal in the received signal using the leakage cancelation signal, the cancelation processing unit is configured to supply the leakage cancelation signal to a receiver of the received signal after low noise amplification of the received signal.

16. A transceiver comprising:
a receiver configured to receive a receiver signal;
a transmitter configured to transmit a transmitter signal, the transmitter comprising a power amplifier;

a feedback receiver configured to sample an output signal of the power amplifier and downconvert the sampled signal; and a cancelation processing unit configured to:
  receive the downconverted signal from the feedback receiver;
  process the downconverted signal for cancelation of a leakage signal caused by the transmitter signal and upconvert the downconverted signal to a radio frequency of the transmitter to generate a leakage cancelation signal; and
  supply the leakage cancelation signal to a path of the receiver to cancel at least some of the leakage signal in the receiver signal.

17. The transceiver of claim 16 further comprising:
a transmitter leakage baseband processing unit configured to identify a remnant of the leakage signal in the received signal reaching baseband; and
a modem configured to modify parameters used by the cancelation processing unit in generating the leakage cancelation signal based on the identified remnant of the leakage signal.

18. The transceiver of claim 17 further comprising:
a frequency mixer associated with the transmitter leakage baseband processing unit, the frequency mixer configured to shift a frequency of the remnant of the leakage signal in the received signal to compensate for a frequency offset between a frequency of a receiver and a frequency of the transmitter.

19. The transceiver of claim 17, wherein the cancelation processing unit comprises:
a variable gain amplifier configured to match an amplitude of the downconverted signal with an amplitude of the leakage signal in generating the leakage cancelation signal; and
a programmable time delay/phase shift block configured to time delay or phase shift one of the downconverted signal or the upconverted signal in generating the leakage cancelation signal.

20. The apparatus of claim 9, wherein the cancelation processing unit is configured to receive the downconverted signal sampled from an output signal of the transmitter in the transceiver.

* * * * *